United States Patent
Francy et al.

(10) Patent No.: US 10,805,337 B2
(45) Date of Patent: Oct. 13, 2020

(54) POLICY-BASED NETWORK SECURITY

(71) Applicant: The Boeing Company, Chicago, IL (US)

(72) Inventors: Faye I. Francy, Baltimore, MD (US); Gregory J. J. Small, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/577,936

(22) Filed: Dec. 19, 2014

(65) Prior Publication Data

US 2016/0182559 A1 Jun. 23, 2016

(51) Int. Cl.
*H04L 29/06* (2006.01)

(52) U.S. Cl.
CPC ...... *H04L 63/1441* (2013.01); *H04L 63/1425* (2013.01)

(58) Field of Classification Search
CPC .................. H04L 63/1441; H04L 63/1425
See application file for complete search history.

(56) References Cited

U.S. PATENT DOCUMENTS

| | | | |
|---|---|---|---|
| 6,408,391 B1 | 6/2002 | Huff et al. | |
| 6,473,851 B1 * | 10/2002 | Plutowski | G06N 20/00 713/1 |
| 7,307,999 B1 * | 12/2007 | Donaghey | H04L 63/0227 370/389 |
| 7,493,659 B1 | 2/2009 | Wu et al. | |
| 7,660,798 B1 * | 2/2010 | Ludwig | G06F 21/6209 707/783 |
| 7,992,199 B1 * | 8/2011 | Winick | H04L 63/0209 709/225 |
| 8,136,143 B2 * | 3/2012 | Hannel | H04L 63/0218 370/252 |
| 8,326,862 B2 * | 12/2012 | Reznik | G06F 16/24578 707/768 |
| 8,407,785 B2 | 3/2013 | Sidiroglou et al. | |
| 8,539,552 B1 * | 9/2013 | Grabelsky | H04L 63/0892 709/225 |
| 8,543,810 B1 * | 9/2013 | Angal | H04L 63/205 705/50 |

(Continued)

FOREIGN PATENT DOCUMENTS

| | | |
|---|---|---|
| CN | 101582883 A | 11/2009 |
| WO | 2008004498 A1 | 1/2008 |
| WO | 2014045827 A1 | 3/2014 |

OTHER PUBLICATIONS

NPL Search (Google Scholar) (Year: 2019).*

(Continued)

*Primary Examiner* — Mahfuzur Rahman
*Assistant Examiner* — Richard W Cruz-Franqui
(74) *Attorney, Agent, or Firm* — Moore Intellectual Property Law, PLLC

(57) ABSTRACT

A method includes, responsive to detecting network activity indicative of a threat, selecting a threat mitigation scheme corresponding to a set of response actions. The method also include filtering the set of response actions based on a policy to generate a set of allowed response actions and executing one or more response actions of the set of allowed response actions.

20 Claims, 8 Drawing Sheets

(56) References Cited

U.S. PATENT DOCUMENTS

| | | | | |
|---|---|---|---|---|
| 8,621,549 B2* | 12/2013 | Lim | G06Q 10/10 | 726/1 |
| 8,646,085 B2* | 2/2014 | Norrman | G06Q 10/06 | 726/25 |
| 8,670,333 B2* | 3/2014 | Miklios | H04L 41/0893 | 370/252 |
| 8,775,333 B1* | 7/2014 | Zahn | G06F 21/552 | 706/12 |
| 8,813,210 B2* | 8/2014 | Blaich | H04L 63/0236 | 726/11 |
| 8,832,715 B2* | 9/2014 | Wuerz | G06Q 10/06312 | 719/318 |
| 8,973,140 B2* | 3/2015 | Shnowske | H04L 63/1408 | 726/23 |
| 9,075,953 B2* | 7/2015 | Small | H04L 63/1408 | |
| 9,130,937 B1* | 9/2015 | Ostermann | H04L 63/0227 | |
| 9,210,090 B1* | 12/2015 | Baldi | H04L 47/2441 | |
| 9,906,496 B2* | 2/2018 | Chang | H04L 63/0218 | |
| 2003/0009585 A1* | 1/2003 | Antoine | H04L 45/08 | 709/238 |
| 2003/0018774 A1* | 1/2003 | Flinck | H04L 61/6013 | 709/223 |
| 2003/0115485 A1 | 6/2003 | Milliken | | |
| 2003/0154271 A1* | 8/2003 | Baldwin | G06F 3/0601 | 709/223 |
| 2005/0025302 A1* | 2/2005 | Schmid | H04L 63/0428 | 379/221.15 |
| 2005/0071642 A1* | 3/2005 | Moghe | H04L 63/1416 | 713/182 |
| 2006/0101516 A1 | 5/2006 | Sudaharan et al. | | |
| 2006/0143709 A1 | 6/2006 | Brooks et al. | | |
| 2006/0156383 A1* | 7/2006 | Waris | H04L 41/0893 | 726/1 |
| 2007/0107059 A1* | 5/2007 | Chasin | H04L 63/126 | 726/23 |
| 2007/0255769 A1* | 11/2007 | Agrawal | G06Q 10/06 | |
| 2008/0115202 A1* | 5/2008 | McKay | H04L 63/029 | 726/12 |
| 2009/0300156 A1* | 12/2009 | Yalakanti | H04L 41/0806 | 709/223 |
| 2010/0071054 A1 | 3/2010 | Hart | | |
| 2010/0107240 A1* | 4/2010 | Thaler | H04L 63/107 | 726/15 |
| 2010/0154025 A1* | 6/2010 | Esteve Balducci | H04L 63/20 | 726/1 |
| 2010/0241595 A1* | 9/2010 | Felsher | G06F 19/328 | 705/400 |
| 2010/0284327 A1* | 11/2010 | Miklos | H04L 41/0893 | 370/328 |
| 2010/0325412 A1* | 12/2010 | Norrman | G06Q 10/06 | 713/100 |
| 2010/0333165 A1* | 12/2010 | Basak | H04L 63/0218 | 726/1 |
| 2011/0083081 A1* | 4/2011 | Jaudon | G06F 9/455 | 715/743 |
| 2011/0153944 A1* | 6/2011 | Kursawe | G06F 12/0802 | 711/122 |
| 2011/0296430 A1* | 12/2011 | Jandhyala | G06F 21/6218 | 718/108 |
| 2012/0053945 A1* | 3/2012 | Gupta | G10L 15/22 | 704/256 |
| 2012/0054163 A1* | 3/2012 | Liu | H04L 41/0873 | 707/694 |
| 2012/0159624 A1 | 6/2012 | König | | |
| 2012/0254939 A1* | 10/2012 | Lum | H04L 63/20 | 726/1 |
| 2012/0284331 A1* | 11/2012 | Kambatla | G06Q 10/06 | 709/204 |
| 2013/0097662 A1* | 4/2013 | Pearcy | G06F 21/577 | 726/1 |
| 2013/0212641 A1* | 8/2013 | Stiekes | H04L 63/0227 | 726/1 |
| 2013/0263155 A1* | 10/2013 | Wuerz | G06F 9/542 | 719/318 |
| 2013/0263209 A1* | 10/2013 | Panuganty | H04L 43/04 | 726/1 |
| 2013/0263258 A1 | 10/2013 | Freeman et al. | | |
| 2013/0305357 A1* | 11/2013 | Ayyagari | H04W 12/06 | 726/22 |
| 2013/0339514 A1* | 12/2013 | Crank | H04L 63/1408 | 709/224 |
| 2014/0137240 A1* | 5/2014 | Smith | H04L 63/1441 | 726/22 |
| 2014/0315536 A1* | 10/2014 | Chow | H04W 8/18 | 455/419 |
| 2014/0331285 A1* | 11/2014 | Desai | H04L 63/1408 | 726/4 |
| 2014/0337528 A1* | 11/2014 | Barton | H04L 63/102 | 709/225 |
| 2015/0019762 A1* | 1/2015 | Lim | H04L 63/105 | 710/18 |
| 2015/0101011 A1* | 4/2015 | Hutton | G06F 21/56 | 726/1 |
| 2015/0200970 A1* | 7/2015 | Lim | H04L 67/42 | 726/1 |
| 2015/0242415 A1* | 8/2015 | Martini | H04W 4/029 | 707/694 |
| 2015/0242691 A1* | 8/2015 | Ottlik | G08B 13/19652 | 382/103 |
| 2015/0269383 A1* | 9/2015 | Lang | G06F 21/57 | 726/1 |
| 2015/0294014 A1* | 10/2015 | Reznik | G06F 16/9535 | 707/706 |
| 2015/0312311 A1* | 10/2015 | Subramanian | H04L 41/0246 | 709/223 |
| 2015/0326605 A1* | 11/2015 | Small | H04W 12/1206 | 726/23 |
| 2015/0365438 A1* | 12/2015 | Carver | H04L 63/1416 | 726/1 |
| 2015/0378700 A1* | 12/2015 | Rachamadugu | G06F 8/60 | 717/120 |
| 2015/0381641 A1* | 12/2015 | Cabrera | H04L 63/1425 | 726/23 |
| 2016/0028760 A1* | 1/2016 | Yang | H04L 63/0263 | 726/13 |
| 2016/0080322 A1* | 3/2016 | Prisser | H04L 63/102 | 726/1 |
| 2016/0093216 A1* | 3/2016 | Lee | G06Q 10/063114 | 340/870.11 |
| 2016/0124974 A1* | 5/2016 | Plumb | G06F 16/122 | 707/689 |
| 2016/0127272 A1* | 5/2016 | Wang | H04L 45/66 | 370/392 |
| 2016/0127417 A1* | 5/2016 | Janssen | H04L 63/20 | 726/1 |
| 2016/0182559 A1* | 6/2016 | Francy | H04L 63/1441 | 726/1 |
| 2016/0226912 A1* | 8/2016 | Clark | H04L 63/20 | |
| 2016/0269988 A1* | 9/2016 | Li | H04W 48/14 | |
| 2016/0366182 A1* | 12/2016 | Uchiyama | H04L 63/0227 | |

OTHER PUBLICATIONS

NPL Search (Google Scholar) (Year: 2020).*

Extended European Search Report for EP Application No./ Patent No. 15200886.8-1870 from the European Patent Office dated Apr. 13, 2016, (7 pages).

"Intrusion Detection, Incident Response, and Integrity Control", <http://www.drtomoconnor.com/3100/31001ect07.html>, Jul. 28, 2014, 9 pages.

"Security is not Just About Defense [Part One]", securityweek.com, <http://www.securityweek.com/security-not-just-about-defense-part-one>, Jul. 19, 2012, 4 pages.

"Worm vs. Worm: Preliminary Study of an Active Counter-Attack Mechanism", Proceeding WORM '04 Proceedings of the 2004 ACM workshop on Rapid malcode, ACM, New York, NY, USA, 2004, pp. 83 through 93.

(56) References Cited

OTHER PUBLICATIONS

"Security's Not Just About Defense Gain an Advantage over Cyber Attacks with a Counter-Offense", Radware, Sep. 2011, 7 pages.
"Malware Counterattack: Hacking the Hackers", cyberarms.wordpress.com, <http://cyberarms.wordpress.com/2010/04/24/malware-counterattack-hacking-the-hackers/>, Apr. 24, 2010, 1 page.
"Anomaly Based Intrusion Detection for Network Monitoring Using a Dynamic Honey6pot", A Thesis submitted at University of Louisville, Department of Computer Engineering and Computer Science, Louisville, Kentucky, Dec. 2004, 82 pages.
"Applying Mobile Agents to Intrusion Detection and Response", NISTIR 6416, U.S. Department of Commerce, Technology Administration, Oct. 1999, 49 pages.
"Strike and Counterstrike: The Law on Automated Intrusions and Striking Back", BlackHat Windows Security 2003, Seattle, Washington, Feb. 27, 2003, 17 pages.
"A Simplified Approach to Identify Intrusion in Network with Anti Attacking Using .net Tool", International Journal of Computer and Electrical Engineering, vol. 3, Jun. 2011, pp. 363 through 367.
"Intrusion Detection Techniques and Approaches", Computer Communications, vol. 25, Issue 15, Sep. 15, 2002, pp. 1356 through 1365.
"Counterattack: Turning the Tables on Exploitation Attempts from Tools like Metasploit", Black Hat DC 2011, 10 pages.
European Examination Report for Application No. 15200886.8, dated Jan. 4, 2018, 4 pgs.
Office Action dated Jul. 22, 2019 mailed in corresponding Japanese Application No. 2015-202758 with English Translation, 7 pgs.
Office Action dated Nov. 26, 2019 mailed in corresponding Chinese Application No. 2015109589603 with English Translation, 25 pgs.
Hamada, Takahiro et at, "Proposal for Network System to Cloudify Home Network Security Functions" The Institute of Electronics, Information and Communication Engineers Technical Report, Sep. 4, 2014, vol. 114, No. 207, p. 105-110.
Ma Xin et al., ("Study of Automated Intrusion Response", Application Research of Computers, 2004, No. 4, vol. 21, pp. 91-94, Oct. 8, 2004.
Gong Jian et al., "Incident response management system based on alert life circle", Journal of Dalian University of Technology, supplement 2005, vol. 45, pp. 157-160, Dec. 21, 2005.
Second Office Action dated May 20, 2020 mailed in corresponding Chinese Application No. 2015109589603 with English Translation, pp. 1-11.

* cited by examiner

POLICY-BASED NETWORK SECURITY

FIELD OF THE DISCLOSURE

The present disclosure relates to systems and methods to provide policy-based network security.

BACKGROUND

Computer and network security typically focuses on defending a computer or a system of computers against attacks. New types of attacks are regularly developed. Rather than trying to develop responses to each new threat, a company may rely on others for information about how to respond to a specific threat. For example, a company may use a security vendor company that provides up-to-date information regarding how to response to new threats or provides new responses to old threats. As another example, the company may refer to security researchers for information regarding how to response to threats. Some proposed responses to threats may be considered inappropriate for a particular company or other entity. For example, an aggressive security researcher may propose a response technique that includes counterattacking a source of the threat. Some companies may have policies that would be violated by such actions.

SUMMARY

In a particular embodiment, a system includes a processor and a memory accessible to the processor. The memory stores instructions that are executable by the processor to perform operations including, responsive to detecting network activity indicative of a threat, selecting a threat mitigation scheme corresponding to a set of response actions. The operations further include filtering the set of response actions based on a policy to generate a set of allowed response actions and executing one or more response actions of the set of allowed response actions.

In another particular embodiment, a method includes, responsive to detecting network activity indicative of a threat, selecting a threat mitigation scheme corresponding to a set of response actions. The method also include filtering the set of response actions based on a policy to generate a set of allowed response actions and executing one or more response actions of the set of allowed response actions.

In another particular embodiment, a computer-readable storage device stores instructions that are executable by a processor to cause the processor to perform operations including, responsive to detecting network activity indicative of a threat, selecting a threat mitigation scheme corresponding to a set of response actions. The operations also include filtering the set of response actions based on a policy to generate a set of allowed response actions and executing one or more response actions of the set of allowed response actions.

The features, functions, and advantages that have been described can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Embodiments described herein enable selection of and execution of response actions based on a policy or policies of a particular company or other entity from among an up-to-date (e.g., a best available or state of the art) set of response actions. For example, up-to-date response actions may be made available for use by a network security system from a variety of sources, such as vendors, researchers or other network security systems. Thus, the response actions may be updated without review or oversight based on the policies of a particular company or other entity. As a result, the response actions may include certain actions that are prohibited by a policy, such as counterattack actions, or may exclude certain actions that are required by the policy, such as notifying particular parties. To conform response actions that are executed by the network security system to the policies, the network security system may select a threat mitigation scheme that corresponds to or includes a set of response actions. The response actions of the threat mitigation scheme may then (e.g., at runtime) be filtered based on the policy or policies. For example, response actions that are prohibited may be removed from the set of response actions and response actions that are required may be added to the set of response actions. Thus, response actions performed by the network security system can be conformed to the policy or policies of the particular company or other entity.

Figure 1:
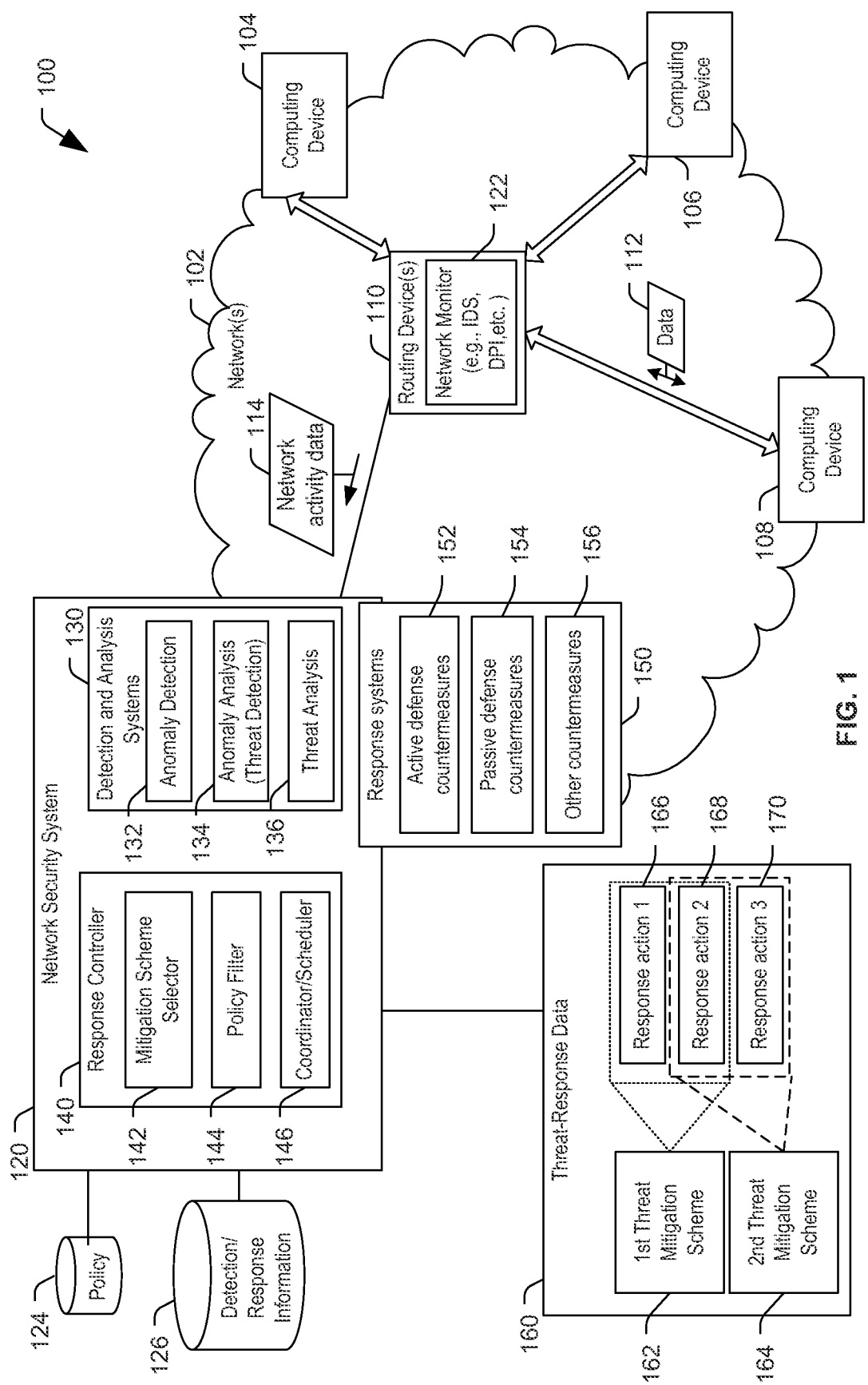
FIG. 1 is a diagram that illustrates a first particular embodiment of a system including a network and a network security system.

FIG. 1 illustrates a particular embodiment of a system 100 including a network 102 and a network security system 120. The network 102 may include routing devices 110 that enable communication between computing devices 104-108 coupled to the network 102. For example, a first computing device 108 may send data 112 to or receive data 112 from one or more of the other computing devices 104-106 via the network 102. Although only one network 102 is shown in FIG. 1, the system 100 may include multiple networks coupled via one or more gateways (not shown) or other devices.

The network security system 120 may be configured to monitor communications sent via the network. For example, the network security system 120 may include or may have access to a network monitoring system, such as network monitors 122 installed on the routing devices 110. The network monitors 122 may include intrusion detection systems (IDS), deep-packet inspection systems (DPI), or other systems that enable monitoring the data 112 transmitted via the network 102 in order to detect anomalies.

The network security system 120 may also include detection and analysis systems 130 that are configured to detect anomalies, analyze the anomalies, detect threats, analyze the threats, or a combination thereof. For example, the network monitors 122 may provide the activity data 114 to the network security system 120. The activity data 114 may be descriptive of activity of the network 102 or devices coupled to the network 102. For example, the activity data 114 may identify which of the computing devices 104-108 are coupled to the network 102, which of the computing devices 104-108 sent data to another of the computing devices 104-108, a quantity or type of the data 112 sent via the network, timing of transmission of the data 112 and/or other data, other information related to communications on the network 102, or a combination thereof.

As described further below, the detection and analysis systems 130 may analyze the activity data 114 to identify anomalies. An anomaly may correspond to an unexpected or unusual occurrence (e.g., event) in the activity data 114, an unexpected or unusual pattern (e.g., set of events) in the activity data 114, absence of an expected occurrence or pattern in the activity data 114, etc. As is also described further below, when an anomaly is detected, the detection and analysis systems 130 may analyze the anomaly to determine whether the anomaly corresponds to or is indicative of a threat (e.g., a threat to the network 102 or to any device coupled to the network 102). When a threat is detected, the detection and analysis systems 130 may analyze the threat to facilitate selection of response actions, to facilitate reporting, or both. For example, the threat may be analyzed to compare the threat to previously detected threats to determine whether the threat is a new instance of a known threat type. The detection and analysis systems 130 may generate threat information indicating detection of the threat. The threat information may also describe the threat. For example, the threat information may include a portion of the activity data 114 corresponding to the anomaly, information descriptive of the anomaly, information descriptive of the threat, information descriptive of a source of the threat, information descriptive of a target of the threat, or a combination thereof. The threat information may be provided to a response controller 140.

The response controller 140 may be configured to select response actions for particular threats based on results of analysis by the detection and analysis systems 130 (e.g., based on the threat information). The response controller 140 may also coordinate executions of a plurality of response actions in order to mitigate or counter detected threats. For example, when a detected threat is determined to be a new instance of a known threat type, the response controller 140 may select response actions that are appropriate for (e.g., known or expected to be effective for) the known threat type, as described further below.

The network security system 120 may be coupled to or include response systems 150. The response systems 150 may be configured to execute particular response actions, such as active defense countermeasures, passive defense countermeasures, active attack countermeasures, or other countermeasures. A particular set of response actions executed by the response systems 150 may be selected by the response controller 140 based on threat-response data 160 and the threat information. The threat-response data 160 may identify a plurality of threat mitigation schemes, such as a first threat mitigation scheme 162 and a second threat mitigation scheme 164. Each threat mitigation scheme 162, 164 may be associated with information indicating specific types of threats for which the threat mitigation scheme is or may be effective. Each of the threat mitigation schemes 162, 164 may include or correspond to a set of response actions 166-170. Each response action 166-170 may correspond to a particular action that may be performed by the response systems 150 in order to respond to a particular kind of threat (e.g., a particular threat type). Examples of response actions include reconfiguring the routing devices 110 to block network access of particular computing devices 104-108, reconfiguring computing devices 104-108 (e.g., to terminate particular processes or programs executing on the computing devices 104-108), reconfiguring security access associated with computing devices 104-108 or the routing devices 110 (e.g., to block access to particular locations in the network 102), and so forth.

The network security system 120 may also be configured to generate information based on particular anomalies that are detected, particular threats that are detected, or particular response actions that are taken. For example, the network security system 120 may include or have access to a detection/response information database 126. The detection/response information database 126 may include information about particular anomalies that were detected by the network security system 120 or by other network security systems (not shown), may include information identifying particular threats (e.g., particular threat instances or particular threat types) that are detected on the network 102 by the network security system 120 or detected on other networks (not shown) by other network security systems (not shown), or a combination thereof. In a particular embodiment, the detection/response information database 126 includes the threat-response data 160 indicating identified threats and effective threat mitigation schemes for each identified threat. In addition to, or instead of, being stored at the detection/response information database 126, the detection/response information may be transmitted via messages to other network security systems (not shown), to the computing devices 104-108, or to other systems coupled to the network 102 or coupled to another network (not shown).

The network security system 120 may include or have access to policy data descriptive of a policy 124 or policies of a company, an agency, or another entity. The policy data may include logical statements (e.g., conditional logical statements, such as if/then statements, Boolean logic statements, etc.) descriptive of, or based on, the policy 124. For example, the logical statements may indicate response actions that are allowed under the policy 124 ("allowed response actions"), response actions that are not allowed under the policy 124 ("disallowed response actions"), or both allowed response actions and disallowed response actions. The policy 124 may indicate that a particular response action is allowed or disallowed based on a specific type of threat, based on when or how the threat was detected, based on a source or location of the source of the threat, based on a target or location of the target of the threat, etc. For example, a particular response action may be allowed when the source of the threat is within a firewall of the network 102 and may be disallowed when the source of the threat is outside the firewall. The policy 124 may be based on corporate directives, legal directives, governmental directives, or a combination thereof.

The policy data may be used by the network security system 120 to filter response actions of a particular threat mitigation scheme in order to select specific response actions to be performed by the response system 150. To illustrate, after the network security system 120 has selected a set of response actions (e.g., by selecting a threat mitigation scheme), the network security system 120 may filter the set of response actions (at runtime) based on the policy 124 to generate a set of allowed response actions. Filtering the set of response actions based on the policy 124 may include removing disallowed response actions from the set of response actions. When indicated by the policy 124, the network security system 120 may also add required response actions to the set of response actions (e.g., at runtime) based on the policy 124.

Thus, the policy 124 enables the network security system 120 to be responsive to changes in corporate, legal, or governmental directives. Additionally, as described below, some or all of the threat-response data 160 may be generated independently of the network security system 120 or without access to the policy 124. For example, one or more of the threat mitigation schemes (e.g., the second threat mitigation schemes 164) may be generated by a security vendor as part of a periodic security update. In this example, the second threat mitigation scheme 164 may identify a response action (e.g., the third response action 170) that is prohibited by the policy 124. By filtering the set of response actions based on the policy 124 after selecting the set of response actions, up-to-date response actions can be used by the network security system 120 without concerns about violating the policy 124.

Some or all of the threat-response data 160 may be generated by the network security system 120 based on outcomes of particular response actions to identified threats. Alternatively or in addition, some or all of the threat-response data 160 may be generated by other network security systems (not shown), security vendors (e.g., network security system vendors), security researchers or advisors (e.g., a university security researcher), an operator or administrator of the network 102 or the network security system 120, other parties, or a combination thereof. The threat-response data 160 may include targeted threat mitigation schemes that are intended to address particular types of threats, as well as generic or best-practices threat mitigation schemes that are more general. The threat-response data 160 may be updated regularly or continuously based on the best available information about response actions appropriate for particular threats. While the threat-response data 160 may be updated continuously or regularly, the policy 124 may be used to filter response actions used by the network security systems 120 to avoid use of response actions that are prohibited by the policy 124 and to include response actions required by the policy 124.

In operation, the computing devices 104-108 may transmit data (e.g., the data 112) via the network 102 to perform activities associated with computing devices 104-108. For example, the computing devices 104-108 may interact via an enterprise network of a company, may be remote from one another (e.g., at different locations associated with the company or at different locations distributed worldwide), and the network 102 may include an enterprise network (e.g., a private network) or a public network, such as the Internet.

The routing devices 110 may enable communication between the computing devices 104-108. Additionally, the routing devices 110 or other devices of the network 102 may include the network monitors 122, which may generate the activity data 114 descriptive of activity of or associated with the network 102. For example, the network monitors 122 may include a DPI system to monitor contents of particular data packets transmitted between the computing devices 104-108. In another example, the network monitors 122 may include an intrusion detection system (IDS) that monitors timing of communications, content of communications, types of communications or information regarding communications between the computing devices 104-108. The network monitors 122 may also monitor other network activity, such as access attempts, pings, domain name server lookups, source and destination of communications, and so forth. The network monitor 122 may provide the activity data 114 to the network security system 120 continuously, periodically or occasionally (e.g., in response to a query or at a non-periodic interval).

The detection and analysis systems 130 may include an anomaly detection system 132 that analyzes the activity data 114 to detect anomalies. For example, the anomaly detection system 132 may detect an increase or decrease in communications between particular computing devices 104-108, may detect transmission of unusual or unexpected types of data 112 between the computing devices 104-108 or to or from a source outside the network (e.g., beyond a firewall associated with the network 102), may detect unusual or unexpected timing of communications, etc.

When an anomaly is detected, the anomaly detection system 132 may provide information about the anomaly to the anomaly analysis system 134. The anomaly analysis system 134 may analyze the particular anomaly to determine whether the anomaly is indicative of a threat. For example, the anomaly analysis system 134 may compare patterns or other information related to the anomaly to patterns or other information associated with known types of threats. As another example, the anomaly analysis system 134 may determine whether high-value (or highly secure) systems are affected by the anomaly. The anomaly analysis system 134 may operate independently of or in conjunction with the anomaly detection system 132. For example, the anomaly detection system 132 may analyze all of the activity data 114 received from the network monitors 122, and the anomaly analysis system 134 may analyze only a subset of the activity data 114 received from the network monitor 122. Thus, the anomaly analysis system 134 may operate in parallel with the anomaly detection system 132 based on detected anomalies indicated by the anomaly detection system 132.

When the anomaly analysis system 134 determines that particular activity data is indicative of a threat, the anomaly analysis system 134 may provide information to the threat analysis system 136. The threat analysis system 136 may analyze the detected threat to determine a type of the threat, to determine whether the threat is a new type of threat or a new instance of a known type of threat, to determine a source of the threat, etc. For example, the threat analysis system 136 may compare the activity data 114 (or other information associated with the threat, such as a source or destination device associated with the activity data 114) to data characteristic of known threat types. In this context, a "known threat type" refers to a type of threat that the network security system 120 is able to identify (e.g., to classify or name, as distinct from merely detecting). For example, the threat-response data 160 may include data that describes known threat types (e.g., fingerprints associated with known threat types). The network security system 120 may be capable of detecting threats that are not known threats, that is, threats that the network security system 120 cannot identify. For example, by analyzing the network activity data 114, the network security system 120 may determine that unexpected access to data of the first computing device 108 is an anomaly and is a threat. However, the unexpected access to the data may not correspond to or match a fingerprint of any known threat type. Thus, the network security system 120 can detect new types of threats. In this context, a "new type of threat" refers to a threat that the network security system 120 can detect, but cannot identify (e.g., cannot map to a known threat type).

The threat analysis system 136 may provide information (e.g., threat data) to the response controller 140. Additionally, each component of the detection and analysis systems 130 may provide information to the detection/response information database 126. For example, the detection and analysis systems 130 may maintain a log in the detection/response information database 126 that indicates or identifies activity data 114 received from the network monitors 122, anomalies detected within the activity data 114, threats detected within the activity data 114, results of analysis of the threats or anomalies, and so forth.

The response controller 140 may include a mitigation scheme selector 142, a policy filter 144, and a coordinator/scheduler 146. When a threat is detected, the detection and analysis systems 130 may provide information descriptive of the threat or an indication of the threat to the mitigation scheme selector 142. The mitigation scheme selector 142 may access the threat-response data 160 to select a particular threat mitigation scheme to be used based on the information from the detection and analysis systems 130, based on the network activity data 114, based on other information, or a combination thereof. Each of the threat mitigation schemes 162, 164 may be mapped to a particular type of threat or to particular types of threats. For example, the first threat mitigation scheme 162 may be associated with a first type of threat, and the second threat mitigation scheme 164 may be associated with a second type of threat. Other threat mitigation schemes (not shown) may be associated with other types of threats. Each of the threat mitigation schemes 162, 164 may include or correspond to a set of response actions. For example, the first threat mitigation scheme 162 includes or corresponds to a first set of response actions, including a first response action 166 and a second response action 168. Additionally, the second threat mitigation scheme 164 includes or corresponds to a second set of response actions, including the second response action 168 and a third response action 170.

Although only three response actions are illustrated in FIG. 1, the threat mitigation schemes 162, 164 may include more than or fewer than three response actions. Additionally, the threat-response data 160 may include more than or fewer than two threat mitigation schemes. Each of the threat mitigation schemes 162, 164 may also indicate an order of execution of the set of response actions. For example, the first threat mitigation scheme 162 may indicate that the first response action 166 is to be initiated (or executed to completion) prior to the second response action 168. Alternatively, certain threat mitigation schemes may indicate that particular response actions may be executed in parallel or in any order. For example, the second threat mitigation scheme 164 may indicate that the second response action 168 and the third response action 170 may be executed in any order, or in parallel with one another.

After the mitigation scheme selector 142 selects a particular threat mitigation scheme (e.g., the first threat mitigation scheme 162), the policy filter 144 may filter the set of response actions associated with the particular threat mitigation scheme based on the policy 124. For example, since the threat-response data 160 may be generated by parties that are not associated with the network security system 120 (e.g., vendors, researchers or other network security systems), the set of response actions may include actions that are prohibited by the policy 124. Alternatively, the set of response actions may not include particular actions that are required by the policy 124. Examples of response actions that may be prohibited by the policy 124 may include counterattack actions, which may be appropriate for other network security systems but may be inappropriate for the network security system 120. Examples of response actions that may be required by the policy 124 and that may not be included in the set of response actions include providing notifications to particular parties (such as a network administrator). Thus, the policy 124 may identify specific response actions that are required, may identify specific response actions that are prohibited, or both. Based on the policy 124 and the selected threat mitigation scheme, the policy filter 144 may generate a set of allowed response actions. The set of allowed response actions may include response actions associated with the threat mitigation scheme that are not prohibited by the policy 124 and response actions that are not associated with the threat mitigation scheme but are required by the policy 124. Thus, the set of allowed response actions corresponds to actions to be performed (e.g., by the response systems 150) to respond to the threat.

After the set of allowed response actions is identified, the coordinator/scheduler 146 may coordinate and schedule execution of response actions of the set of allowed response actions. For example, the coordinator/scheduler 146 may evaluate the response actions based on action dependencies and prior actions to determine an action plan. The action plan identifies a set of response actions that are ready for immediate execution (e.g., a set of next response actions). A response action may be considered ready for immediate execution if all prerequisite actions of the response action have been performed, if resources to execute the response action (e.g., particular response systems) are available, or both. For example, the second response action 168 may be a prerequisite action of the third response action 170. In this example, the third response action 170 may be considered ready for immediate execution after the second response action 168 has been performed (or when the second response action 168 has been started, depending on the relationship between the second response action 168 and the third response action 170). In another example, certain response actions may be executable in parallel, or in any order. In this example, each of these response actions may be considered ready for immediate execution.

After the coordinator/scheduler 146 determines the action plan (e.g., identifies the set of response actions that are ready for immediate execution), the coordinator/scheduler 146 may cause the response systems 150 to execute the response actions of the action plan. For example, the coordinator/scheduler 146 may send data, instructions, or both, to the response systems 150 to cause the response systems 150 to execute the response actions of the action plan. The response systems 150 may include active defense countermeasure systems 152, passive defense countermeasure systems 154, and other countermeasure systems 156. Thus, the coordinator/scheduler 146 may send data and/or instructions to the active defense countermeasure systems 152 to execute a particular active defense countermeasure response action. Additionally, the coordinator/scheduler 146 may send data and/or instructions to the passive defense countermeasures system 154 to execute a particular passive defensive countermeasure response action. Similarly, the coordinator/scheduler 146 may send data and/or instructions to the other countermeasures systems 156 to execute another countermeasure response action (such as a counterattack response action).

During or after execution of particular response actions, the network monitors 122 and the detection and analysis systems 130 may interact to determine results of the particular response actions. For example, the network monitors 122 and the detection and analysis systems 130 may determine, during or after execution of particular response actions, whether a new threat is detected, whether a new anomaly is detected, or whether an existing threat (e.g., a previously detected instance of a threat) is still present.

When the detection and analysis system 130 determines that a previously detected instance of a threat is still present after execution of the action plan, the detection and analysis systems 130 may provide information to the response controller 140. The response controller 140 may cause the coordinator/scheduler 146 to generate a new action plan. The new action plan may include a next set of response actions that are ready for immediate execution. For example, as described above, the second response action 168 may be a prerequisite of the third response action 170. In this example, the second response action 168 may be identified in a first action plan. The third response action 170 may be excluded from the first action plan since the third response action 170 has a prerequisite action (e.g., the second response action 168) that has not been executed. After execution of the first action plan, if the threat is still present, the coordinator/scheduler 146 may generate a second action plan. The third response action 170 may be included in the second action plan since every prerequisite action (e.g., the second response action 168) of the third response action 170 has been executed.

After determining the second action plan, the coordinator/scheduler 146 may send data and/or instructions to the response systems 150 to cause response actions of the second action plan to be executed. Thus, the network security system 120 may iteratively execute a next set of available response actions until an identified threat has been mitigated or a last response action of the allowed set of actions has been performed.

As new instances of threats are detected by the network security system 120, additional threat mitigation schemes may be selected and additional action plans may be generated and coordinated by the coordinator/scheduler 146. Multiple action plans may be executed sequentially or in parallel to address different threats. Additionally, multiple action plans may be executed independently of one another, or dependencies may be defined between the action plans. For example, a first action plan and a second action plan may be executed in parallel. Additionally, in this example, in the first action plan, the second response action 168 may be a prerequisite of the third response action 170, and in the second action plan, the second response action 168 may be a prerequisite of the first response action 166. In this example, if the second response action 168 has been executed for the first action plan, the first response action 166 may be considered ready for immediate execution in the second action plan due to execute of the second response action 168 for the first action plan.

Accordingly, the network security system 120 enables selection of and execution of response actions based on the policies (e.g., the policy 124) of a particular company or other entity to respond to detected threats or anomalies in a network 102. Up-to-date response actions may be made available for use by the network security system 120 (e.g., via the threat-response data 160), but may be filtered based on the policy 124 for compliance with corporate, legal or governmental directives.

In FIG. 1, components of or associated with the network security system 120 are illustrates as functional blocks. For example, the response controller 140 is shown as a particular function block that includes functional sub-blocks, such as the mitigation scheme selector 142, the policy filter, and the coordinator/scheduler 146. The network security system 120 and its components are illustrated as functional blocks merely for convenience of description. In various embodiments, the network security system 120 may include hardware, software, or both, to perform functions described herein as associated with the network security system 120 and its components. For example, the network security system 120 may include a processor and a memory accessible by the processor. The memory may include instructions that are executable by the processor to perform the operations or functions of the network security system 120, as described herein. Additionally, functions described with reference to particular functional blocks may instead be performed by software or hardware associated with others of the functional blocks, combinations of the functional blocks, or portions of particular functional blocks. Thus, the disclosure is not limited to the specific functional blocks illustrated or the arrangement of functions with specific hardware or software.

Further, although particular portions of the system 100 are illustrated as outside the network security system 120 (e.g., the response systems 150, which are shown as outside the network security system 120), this is merely for convenience to illustrate that these portions of the system 100 may be independent of or distinct from the network security system 120. For example, the response systems 150 may perform particular actions independently of the network security system 120. As another example, the response systems 150 may be distributed while the network security system 120 may be centralized. Alternatively, the network security system 120 may be decentralized (e.g., distributed) and the response systems 150 may be centralized or decentralized (e.g., distributed). In particular embodiments, the portions of the system 100 that are illustrated as outside the network security system 120 may be wholly or partially within the network security system 120. Thus, for example, the response systems 150 may be portions of the network security system 120 or may be independent and distinct from (although in communication with) the network security system 120. As another example, the network monitors 122 may be components of the network security system 120 or may be a software or hardware element executing independently of the network security system 120.

Components of the system 100, such as the network security system 120, the response systems 150, the network monitors 122, the threat-response data 160, and so forth, may be centralized (e.g., associated with a particular computing device), or may be decentralized (e.g., distributed among a plurality of computing devices), and may function independently (although cooperatively) or dependently upon one another. Additionally, it is understood that each component of the system 100 may include a processor, memory accessible to the processor, and instructions executable by the processor stored in the memory to perform the actions described herein. Alternatively or in addition, one or more of the components of the system 100 may include hardware (such as an application specific integrated circuit) configured to execute some or all of the functions of the component.

Figure 2:
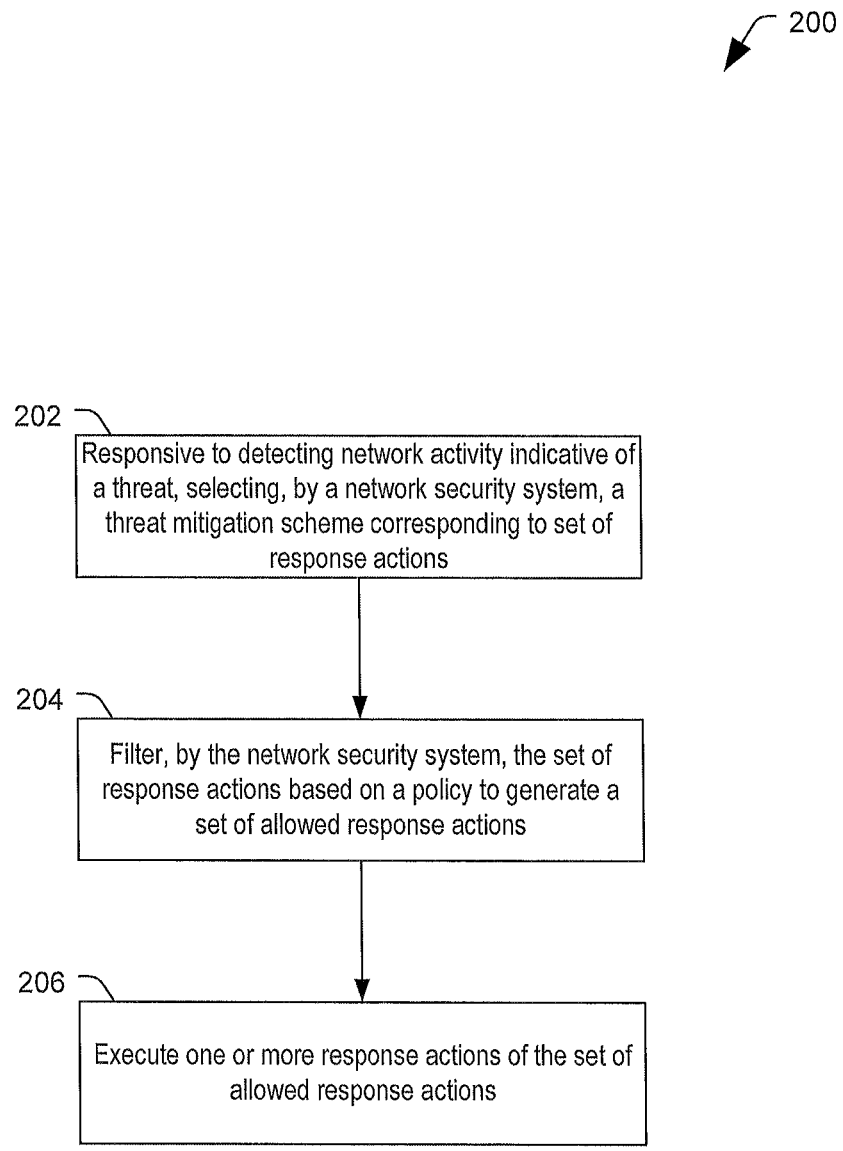
FIG. 2 is a flow chart of a particular embodiment of a method of providing network security.

FIG. 2 is a flowchart illustrating a particular embodiment of the method of providing security for a network. The method 200 may be performed by one or more components of the system 100 of FIG. 1. For example, the method 200 may be performed by the network security system 120.

The method 200 includes, at 202, responsive to detecting network activity indicative of a threat, selecting via the network security system a threat mitigation scheme corresponding to a set of response actions. For example, the network monitors 122 may monitor activity on the network 102, such as communication of data 112 between the computing devices 104-108. Monitoring the network activity may include monitoring content of the data packets communicated via the network 102, monitoring patterns of communication over the network 102, etc. Based on particular activity data 114 provided by the network monitors 122 to the detection and analysis system 130, a threat may be identified. After the threat is identified by the detection and analysis system 130, the response controller 140 may select a particular threat mitigation scheme (e.g., the first threat mitigation scheme 162) to respond to the threat. The threat mitigation scheme may include a set of response actions such as the first response action 166 and the second response action 168.

The method 200 also includes, at 204, filtering the set of response actions based on a policy to generate a set of allowed response actions. For example, after the response controller 140 selects a particular threat mitigation scheme (e.g., the first threat mitigation scheme 162), the policy filter 144 may apply the policy 124 to filter the set of response actions of the particular threat mitigation scheme. The policy 124 may indicate that specific response actions are disallowed, that specific response actions are required, or both. The policy filter 144 may generate the set of allowed response actions, which may include each required response action and may exclude each prohibited response action.

After filtering the set of response actions to generate the set of allowed response actions, the method 200 may include, at 206, executing one or more response actions of the set of allowed response actions. For example, when the set of allowed response actions includes the first response action 166 and the second response action 168, one or both of the response actions 166, 168 may be executed by the response systems 150. To illustrate, the coordinator/scheduler 146 may determine an action plan based on the set of allowed response action. For example, the coordinator/scheduler 146 may determine whether there are dependencies between the first response action 166 and the second response action 168 (e.g., whether the first response action 166 is a prerequisite of the second response action 168, or vice versa). When the first response action 166 is a prerequisite action of the second response action 168 and every prerequisite action of the first response action 166 has been performed (e.g., the first response action 166 is immediately executable), the first response action 166 may be included in the action plan. However, in this example, the second response action 168 may be excluded from the action plan since the second response action 168 has at least one prerequisite action (e.g., the first response action 166) that has not been performed and therefore the second response action 168 is not immediately executable.

Thus, the method 200 enables selecting a set of response actions (e.g., by selecting a threat mitigation scheme from a set of threat mitigation schemes) and filtering the response actions based on policies of a company or of another entity in order to ensure that response actions performed by the network security system 120 are compliant with the policies. Thus, the threat-response data 160 can be continuously or regularly updated independently of the policies, enabling use of up-to-date (e.g., state of the art or best available) response actions without concern that the policies will be violated.

Figure 3:
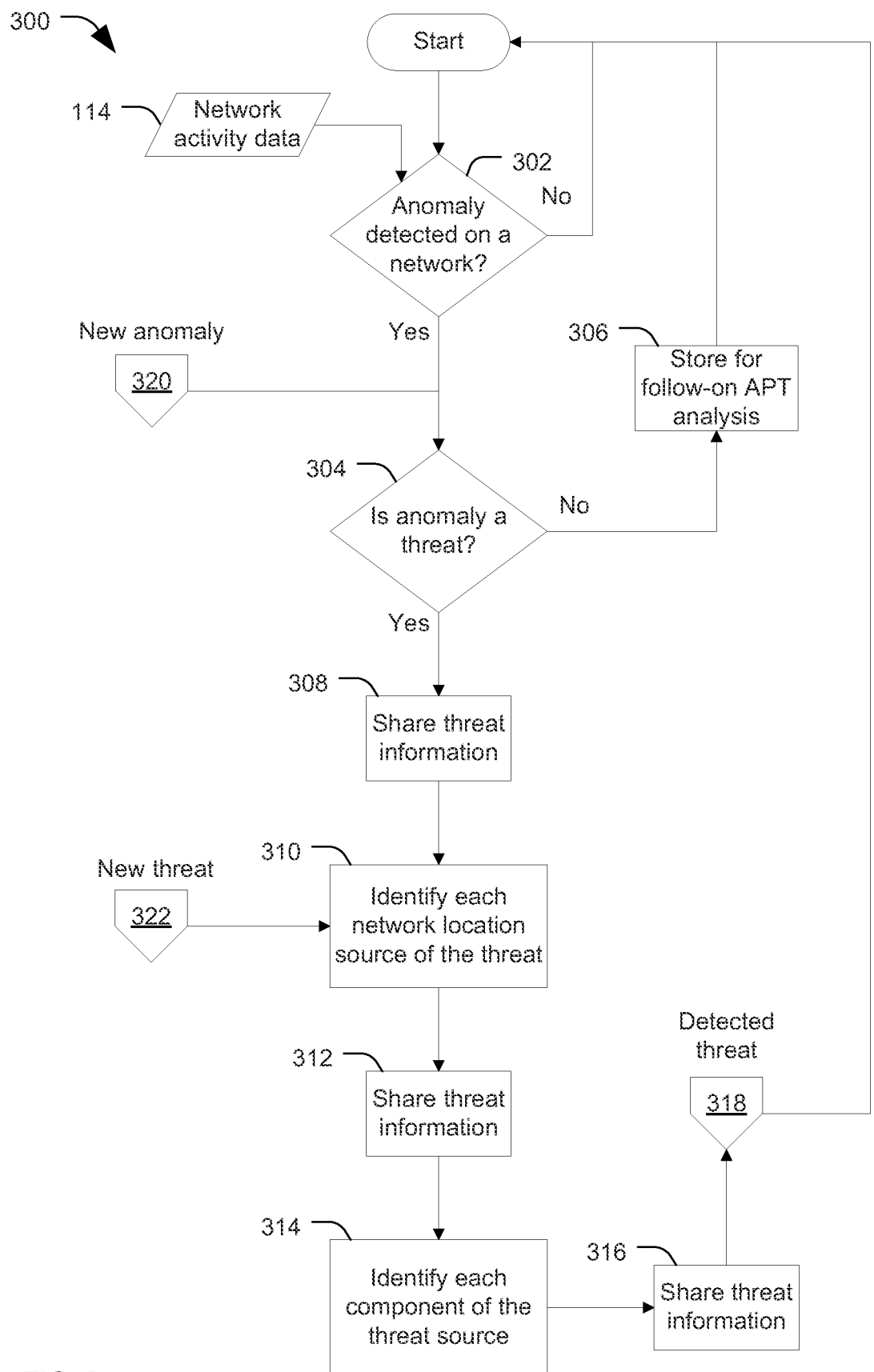
FIG. 3 is a flow chart of a particular embodiment of a method of anomaly and threat detection.

FIG. 3 is a flow chart of a particular embodiment of a method 300 of anomaly and threat detection. The method 300 may be performed by the network security system 120 of FIG. 1. For example, the method 300 may be performed by the detection and analysis systems 130 in response to or after receipt of the network activity data 114.

The method 300 includes, at 302, analyzing the activity data 114 to determine whether the network activity data 114 indicates an anomaly on a network. The network may be a single network (e.g., the network 102 of FIG. 1) or a set of interconnected networks (e.g., an Intranet). Additionally, new anomalies may be identified, at 320, based on processes associated with the method 400 of FIG. 4, as described further below. Each anomaly may be analyzed, at 304, to determine whether the anomaly represents or indicates a threat (e.g., a cyber threat).

Data related to anomalies that are not threats is stored (e.g., at the detection/response information database 126) for follow-on Advanced Persistent Threat (APT) analysis, at 306. For each anomaly that is identified as a threat, information related to the threat (e.g., threat information) is shared, at 308 to create wider situational awareness. For example, the network activity data 114 that corresponds to the anomaly that is identified as a threat may be provided to threat analysis systems, other network security systems, the detection/response information database 126, or other systems or parties.

A network location of each threat source may be determined, at 310. For example, a specific computing device (e.g., one of the computing devices 104-108 of FIG. 1) that is a source of or a destination for data that is associated with the anomaly may be determined. As another example, a determination may be made whether the threat corresponds to or is associated with a device that is internal to a network firewall or a device that is external to the network firewall. Information related to the threat may be shared, at 312. For example, the network location or locations associated with the threat may be added to information shared at 308. Additionally, new threats may be identified, at 322, based on processes associated with the method 400 of FIG. 4, as described further below. Network locations of each source of the new threat source may also be determined, at 310.

Source device components associated with the threat may be identified, at 314. The source device components may include hardware or software of a computing device that is a source of the threat. For example, when the first computing device 108 is determined to be the source of the threat (e.g., the device on which a malware program is executing), the source device components may include a processor of the first computing device 108, one or more memory devices of the first computing device 108, a peripheral device coupled to the first computing device 108, a removable memory device coupled to the first computing device 108, a specific software component (e.g., application) executing at the first computing device 108, etc. Information related to the threat may be shared, at 316. For example, the source device components associated with the threat may be added to information shared at 308 or at 312. The threat information may also be provided to the method 400 of FIG. 4, as the detected threat 318.

Figure 4:
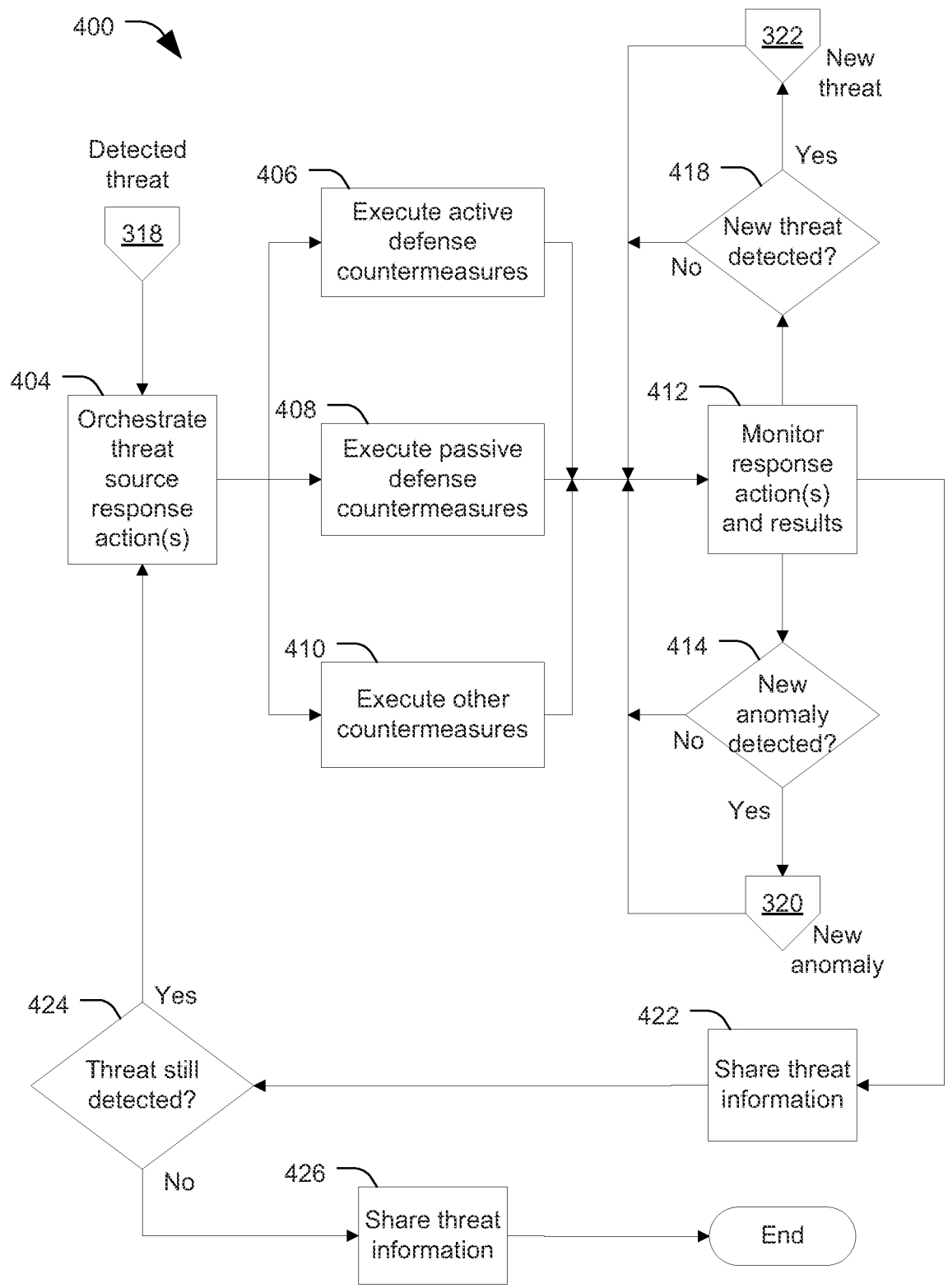
FIG. 4 is a flow chart of a particular embodiment of a method of responding to a threat.

FIG. 4 is a flow chart of a particular embodiment of a method 400 of responding to a threat. The method 400 may be performed by the network security system 120 of FIG. 1. For example, the method 400 may be performed by the response controller 140 in conjunction with the response systems 150.

As shown in FIG. 4, the method 400 may be triggered by detection of a threat (e.g., at 318). For example, the method 400 may begin with receipt of information descriptive of the threat (e.g., a threat source location and/or source device component from the method 300) at the response controller 140. In a particular embodiment, each detected threat results in execution of a new instance of the method 400 by the response controller 140.

In response to each detected threat, a set of threat source response actions (e.g., one or more response actions 166-170) are orchestrated, at 404. In this context, orchestration includes selection of the set of response actions (e.g., by selecting a threat mitigation scheme), filtering the set of response actions based on a policy, and generating an action plan, as described further with reference to FIGS. 5 and 7. After an action plan is generated, one or more response actions identified by the action plan may be performed. For example, the response actions may include one or more active defense countermeasures, which may be executed at 406. Examples of active defense countermeasures 406 may include shutting down the source system or replacing a source device component with a "known good" component. The response actions may also, or in the alternative, include one or more passive defense measures, which may be executed at 408. Examples of passive defense measures 408 include redirecting network traffic from the source system or isolating the source system while the threat is further analyzed. The response actions may also, or in the alternative, include other countermeasures, which may be executed at 410. Examples of other countermeasures include monitoring without taking any action or performing a counterattack action.

The method 400 also includes, at 412, monitoring execution of the response actions and results of the response action. For example, the response systems 150 may report progress of execution of the response actions. In another example, the network monitors 122 may report activity data 114 associated with the response actions or following execution of the response actions.

If a new threat is detected, at 418, while monitoring the response actions and results of the response actions, information related to the new threat is provided, at 322, to the method 300. Similarly, if a new anomaly is detected, at 414, while monitoring the response actions and results of the response actions, information related to the new anomaly is provided, at 320, to the method 300. For example, while monitoring the response actions and results of the response action, the network monitors 122 of FIG. 1 may generate new network activity data 114, which may be provided to the network security system 120. The detection and analysis systems 130 may analyze the new network activity data 114 to detect the new anomaly or new threat and to generate a new instance of the method 300. Additionally, after or while monitoring the response actions and results of the response actions, threat information may be shared, at 422. For example, the activity data 114 that corresponds to the anomaly that is identified as the threat may be provided to threat analysis systems, other network security systems, the detection/response information database 126, or other systems or parties.

At 424, a determination may be made whether the threat is still detected (e.g., was not fully resolved by the response actions). If the threat is not still detected, threat information is shared, at 426. For example, information may be provided to threat analysis systems, other network security systems, the detection/response information database 126, or other systems or parties that the response actions appear to have resolved the threat. Thus, the threat mitigation scheme used to respond to the threat may be indicated to be effective for the particular threat type of the threat. If the threat is still detected, a new orchestration of response actions may be performed, at 404. For example, a new action plan may be generated, as described further with reference to FIG. 5.

Figure 5:
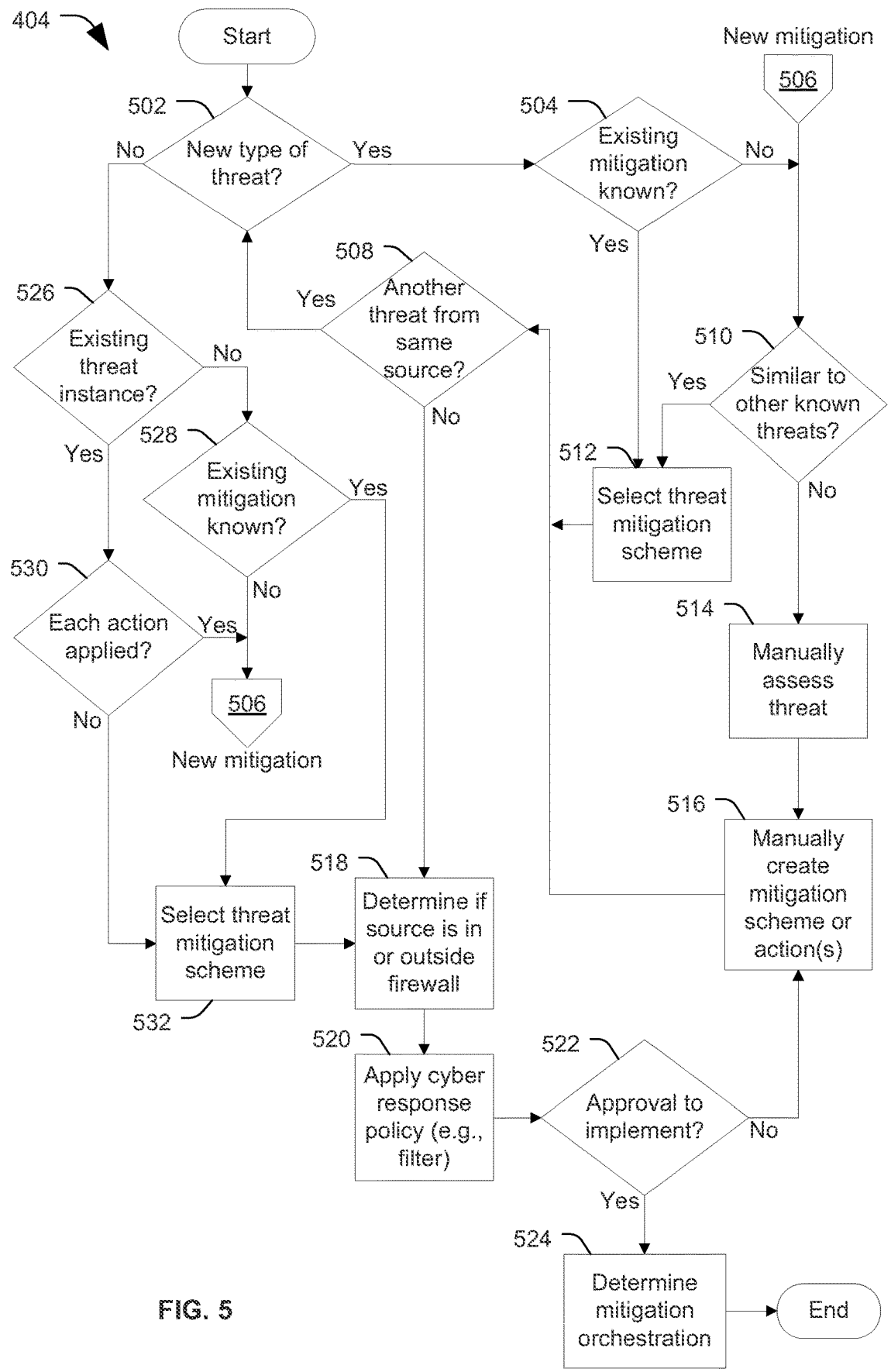
FIG. 5 is a flow chart of a particular embodiment of a method of selecting response actions based on a policy.

FIG. 5 is a flow chart of a particular embodiment of a method 404 of selecting response actions based on a policy. The method 404 may be performed by the network security system 120 of FIG. 1. For example, the method 400 may be performed by the response controller 140, by the mitigation scheme selector 142, by the policy filter 144, or by a combination thereof.

The method 404 includes, at 502, determining whether the threat is a new type of threat. For example, characteristics of the threat (e.g., based on the activity data 114 associated with the threat) may be compared to characteristics (e.g., a fingerprint) of known threat types. If the characteristics of the threat match characteristics of a known threat type, the threat may be determined to correspond to the known threat type. Conversely, if the characteristics of the threat do not match characteristics of any known threat type, the threat may be determined to correspond to a new type of threat.

If the threat is a new type of threat, a determination is made, at 504, whether any existing threat mitigation scheme is known that may be used to mitigate the threat. For example, in a particular case, the characteristics of the threat may not match characteristics of any threat previously experienced by the network security system 120. In this example, the network security system 120 may search other sources for information related to responding to the threat. The other sources may include other network security systems or databases of threat information that identify characteristics (e.g., fingerprints) of the threats identified by others (e.g., researchers or security vendors). The other sources may also include information related to threat mitigation schemes that may be used to address the threat. When an existing threat mitigation scheme is known (e.g., can be determined based on information from the other sources) that may be used to address the threat, the threat mitigation scheme may be selected, at 512. The method 404 may also include, at 508, determining whether there is another threat from the same source. For example, the response controller 140 may determine whether two or more threats associated with the same source have been identified. If so, the threats may be related, and response controller 140 may combine attempts to mitigate each threat (e.g., to effectively treat the threats as a single threat or as inter-related threats).

If no existing threat mitigation scheme is known, at 504, to address the threat, the method 404 may include, at 510, determining whether the threat is similar to another known threat. For example, in a particular case, characteristics of the threat may be compared to characteristics of known threats to see if the threat is similar enough to a known threat to conclude (or speculate) that a threat mitigation scheme that is effective for the known threat may work for the threat. When the threat is similar to another known threat, the threat mitigation scheme associated with the other known threat may be selected, at 512. When the threat is not similar to another known threat, at 510, the method 404 may include prompting a user to manually assess the threat, at 514. A manually created threat mitigation scheme or set of response actions may be received, at 516, in response to the prompt.

When there are no other threats from the same source, at 508, after selection of a threat mitigation scheme, at 512, or after manual creation of a threat mitigation scheme or set of response actions, at 516, the method 404 may include determining a location of the threat (e.g., whether the source is inside or outside of a firewall of the network), at 518. The method 404 may also include applying a cyber response policy, at 520. Applying the cyber response policy may include determining whether particular response actions of the selected threat mitigation scheme are prohibited based on the policy, determining whether the selected threat mitigation scheme includes response actions that are required by the policy, or both. Applying the cyber response policy may also include generating an allowed set of response actions. The allowed set of response actions excludes each response action of the selected threat mitigation scheme that is prohibited based on the policy and includes each response action that is required by the policy (whether the response action is part of the selected threat mitigation scheme or not). For example, the policy filter 144 may filter the selected threat mitigation scheme, as described with reference to FIG. 1.

In a particular embodiment, the method 404 may also include determining whether the selected threat mitigation scheme (after application of the cyber response policy) is approved to implement. For example, a user (e.g., an administrator) associated with the network security system 120 may be prompted for approval to implement the selected threat mitigation scheme. In other examples, the approval to implement may be automatic (e.g., based on an automated process implemented by a computer) or may be omitted from the method 404. If the threat mitigation scheme is approved, at 522, a mitigation orchestration is determined, at 524, as described further with reference to FIG. 7. If the threat mitigation is not approved, at 522, a threat mitigation scheme or a set of response actions may be manually created, at 516.

Returning to 502, if the threat is not a new type of threat, the method 404 may include determining whether the threat corresponds to an existing threat instance, at 526. The threat corresponds to an existing threat instance if the threat is already being addressed by a threat mitigation scheme. For example, if a first set of response actions have been performed for the threat, then the threat is an existing threat instance. To illustrate, the threat may be an existing threat instance when one or more response actions have been performed and the threat is still detected, at 424 of FIG. 4. If the threat is an existing threat instance, the method 404 includes determining whether each response action of a threat mitigation scheme for the threat instance has been applied, at 530. If one or more response actions of the threat mitigation scheme for the threat instance have not been applied, the method 404 may include selecting the existing threat mitigation scheme, at 532. The method 404 may then proceed as described above.

If the threat is not an existing threat instance, the method 404 includes determining whether an existing threat mitigation scheme for the threat is known, at 528. For example, since the threat is not a new type of threat (as determined at 502), the threat-response data 160, the detection/response information database 126, or the mitigation scheme selector 142 of FIG. 1 may include or have access to information mapping a type of the threat to a particular threat mitigation scheme. If no existing threat mitigation scheme for the threat is known, at 528, or if every response action of a threat mitigation scheme has been applied and the threat is still detected, at 530, the method 404 may advance to determine a new mitigation scheme 506 and treat the threat as a new type of threat. For example, the method 404 may include determining whether the threat is similar to other known threats, at 510.

Thus, the method 404 enables selection of response actions for particular threats. The method 404 also enables application of a policy, such as the policy 124, to the selected response actions to ensure that the response actions conform to the policy.

Figure 6:
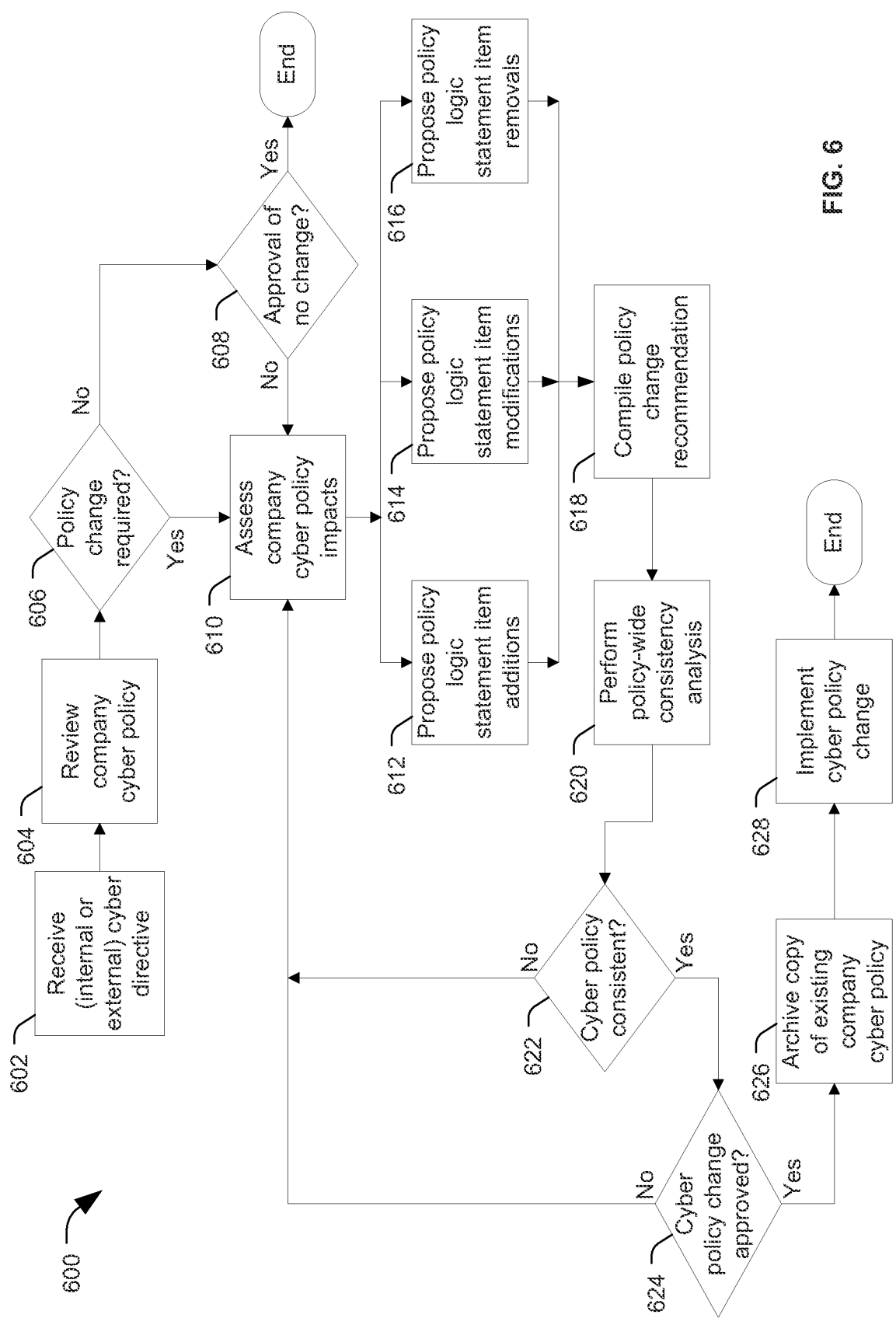
FIG. 6 is a flow chart of a particular embodiment of a method of updating a policy.

FIG. 6 is a flow chart of a particular embodiment of a method 600 of updating a policy. The method 600 may be performed by the network security system 120 of FIG. 1, by one or more of the computing devices 104-108, or by another computing device.

The method 600 includes, at 602, receiving a directive (such as a cyber directive, a security directive, a legal directive, etc.). The directive may be received from an internal source (e.g., from a cyber security team or from a legal department of a company or other entity) or from an external source (e.g., from an insurance company or from a regulatory agency). The directive may include information indicating that certain actions are prohibited or are required.

The method 600 includes, at 604, reviewing existing policies (e.g., the policy 124 of FIG. 1) of the company or other entity to determine, at 606, whether a policy change is required based on the directive. The review may be performed manually, may be performed by a computing device, or a combination thereof. For example, a computer-implemented process may identify particular aspects of the policy and may prompt a user to determine whether the particular aspects indicate that a policy update is required.

If no policy change is required, the method 600 includes prompting a user (e.g., a policy administrator) to approve not changing the policy, at 608. If the user does not approve of not changing the policy, at 608, or if a determination is made that a policy change is required, at 606, the method 600 includes assessing company (or other entity) cyber policy impacts, at 610. Based on the assessment, changes to the policy may be proposed. For example, the policy may include or be expressed as a set of logical statements. In this example, changes to the policy may be proposed as logical statements. To illustrate, changes to the policy may be proposed as policy logical statement item additions, at 612, may be proposed as policy logic statement item modifications, at 614, may be proposed as policy logic statement item removals, at 616, or a combination thereof.

The method 600 may also include compiling the policy change recommendation, at 618. Compiling the change recommendation may include aggregating the policy change recommendations, de-duplicating the policy change recommendations, removing or modifying conflicting recommendations, selecting preferred policy change recommendations when two or more alternative recommendations have been proposed, etc. The method 600 may also include performing a policy-wide consistency analysis, at 620. For example, the policy-wide consistency analysis may determine whether policy changes in the compiled policy change recommendations would conflict with portions of the policy that are not being changed.

If the cyber policy is not consistent, at 622, based on the compiled policy change recommendations, the method 600 may return to 610 to assess company policy impacts and generate new proposed policy changes. If the cyber policy is consistent, at 622, the method 600 may include determining whether the cyber policy changes are approved, at 624. For example, a user (e.g., a policy administrator) or a set of users (e.g., a policy overview committee) may be prompted to approve the changes to the cyber policy. If the change is not approved, the method 600 may return to 610 to assess company policy impacts and generate new proposed policy changes. If the change is approved, a copy of the existing policy (e.g., before changes) may be archived, at 626, and the cyber policy changes may be implemented, at 628. Implementing the cyber policy changes may include replacing use of the policy before the changes with the update policy after the changes. For example, a version of the policy 124 used by the policy filter 144 may be replaced with the update policy.

Figure 7:
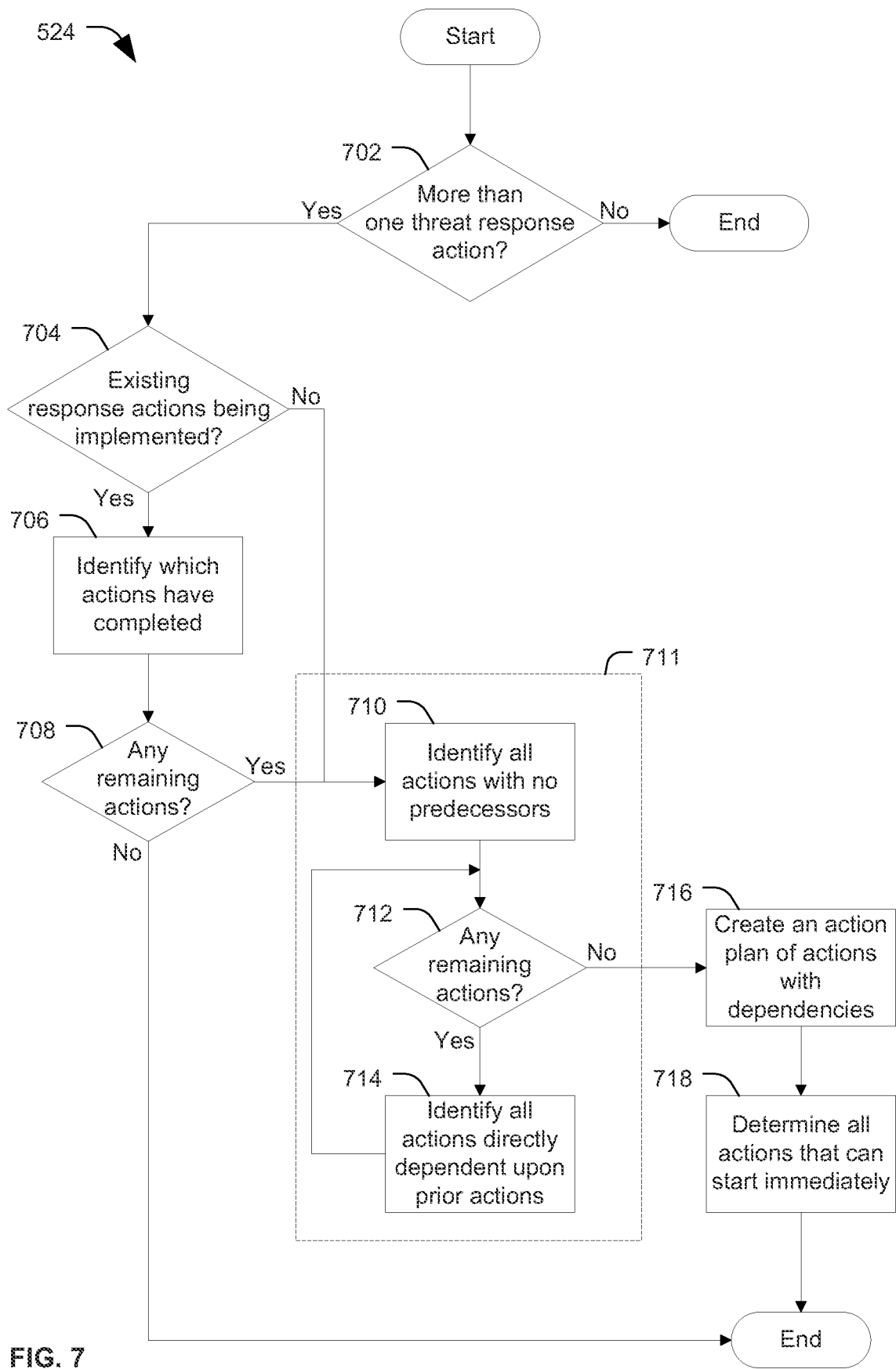
FIG. 7 is a flow chart of a particular embodiment of a method of determining mitigation orchestration.

FIG. 7 is a flow chart of a particular embodiment of a method 524 of determining mitigation orchestration (e.g., of generating an action plan to schedule execution of response actions). The method 524 may be performed by the network security system 120 of FIG. 1. For example, the method 524 may be performed by the response controller 140, by the coordinator/scheduler 146, or a combination thereof.

The method 524 includes, at 702, determining whether a selected threat mitigation (e.g., the threat mitigation scheme selected at 512 of FIG. 5, the threat mitigation scheme selected at 532 of FIG. 5, or the threat mitigation scheme manually generated at 516 of FIG. 5) includes more than one response action. When the selected threat mitigation does not include more than one response action, the method 524 ends.

When the selected threat mitigation includes more than one response action, the method 524 includes, at 704, determining whether response actions of the selected threat mitigation scheme (e.g., existing response actions) have been or are being implemented. If existing response actions are being implemented (e.g., if one or more response actions of the threat mitigation scheme have been implemented or are being implemented), the method 524 includes identifying which actions of the threat mitigation scheme have completed, at 706. The method 524 also includes, at 708, determining whether any actions of the threat mitigation scheme remain to be executed. If no actions remain to be executed, the method 524 ends. If one or more actions remain to be executed, at 708, or if no existing response actions are being implemented (e.g., no response action of the threat mitigation scheme has been or is being implemented), the method 524 include sorting the response actions associated with the threat mitigation scheme (or the remaining response actions associated with the threat mitigation scheme) based on dependencies, at 711. For example, the method 524 may include, at 710, identifying all actions of the threat mitigation scheme with no predecessors (or with no unexecuted predecessors). In this example, the method 524 may also include, at 712, determining whether any response actions of the threat mitigation scheme remain (e.g., were not identified as having no predecessors). If one or more response actions of the threat mitigation scheme remains, the method 524 includes, at 714, identifying all actions that are directly dependent upon prior actions, at 714.

When no response actions of the threat mitigation scheme remain to be sorted based on dependencies, the method 524 includes creating an action plan that includes or identifies the response actions and their dependencies, at 716. The method 524 also includes determining all actions that can start immediately. For example, each response action of the threat mitigation scheme that is ready for immediate execution may be identified. The set of response actions that are ready for immediate execution may be provided to the method 400 of FIG. 4 to orchestrate the threat response actions, at 404.

Figure 8:
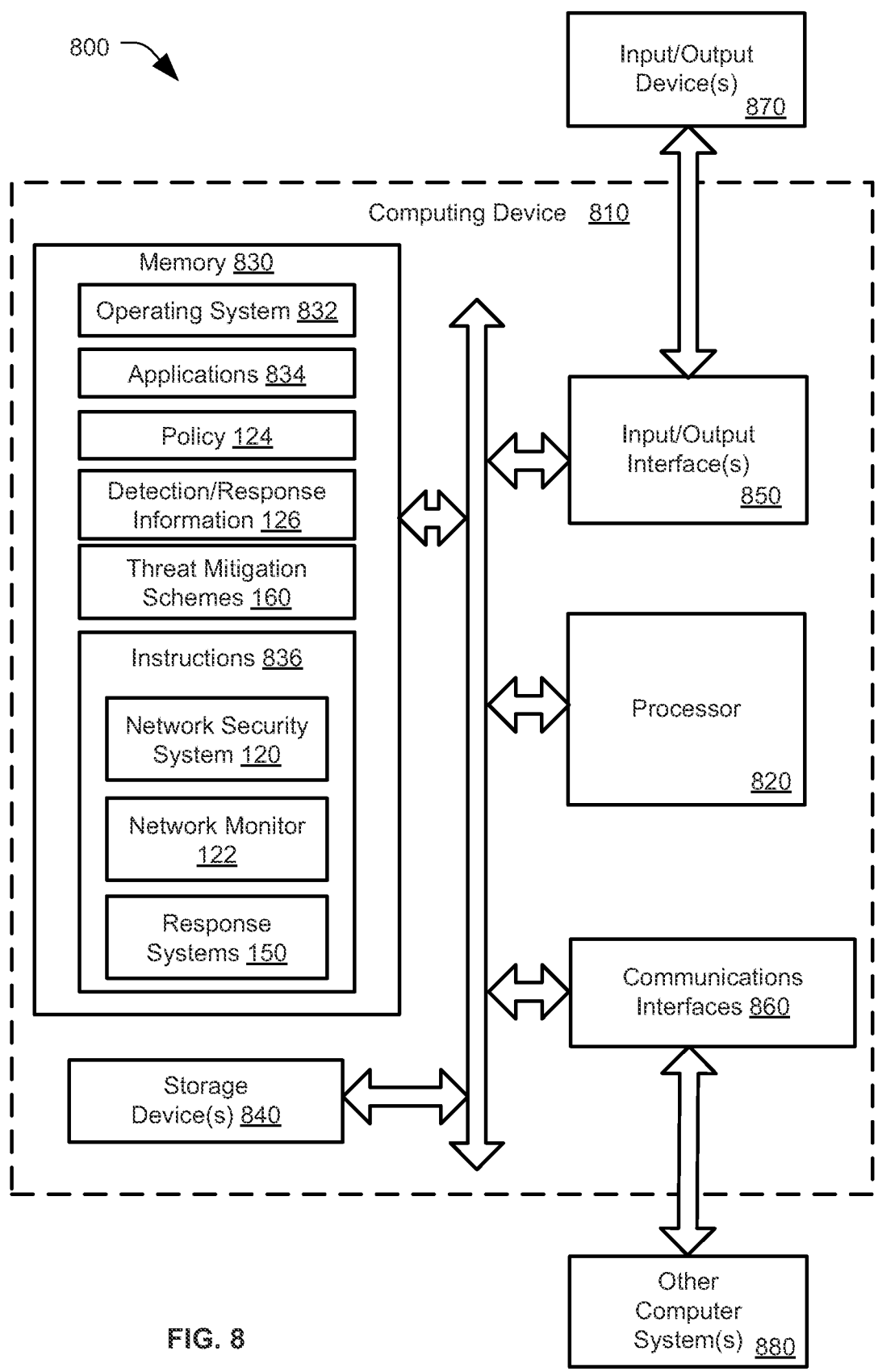
FIG. 8 is a block diagram that illustrates a particular embodiment of a computing system of a network security system.

Referring to FIG. 8, a block diagram of a computing environment is shown and generally designated 800. The computing environment 800 includes a computing device 810 to support embodiments of computer-implemented methods and computer-executable program instructions (or code) according to the present disclosure. For example, the computing device 810, or portions thereof, may execute instructions to provide security for a network. In a particular embodiment, the computing device 810 may include, may be included with, or may correspond to the system 100 of FIG. 1. For example, the computing device 810 may execute all or a portion of the network security system 120, the network monitor 122, the response systems 150, or a combination thereof. Alternatively, the computing device 810 may include or correspond to one of the computing device 104-108 of FIG. 1, or to one of the routing devices 110 of FIG. 1.

The computing device 810 may include a processor 820 of FIG. 1. The processor 820 may communicate with a memory 830. The memory 830 may include volatile memory devices (e.g., random access memory (RAM) devices), nonvolatile memory devices (e.g., read-only memory (ROM) devices, programmable read-only memory, and flash memory), or both. The memory 830 may store data and/or instructions 836 that are executable by the processor 820. For example, the memory 830 may store an operating system 832, which may include a basic/input output system for booting the computing device 810 as well as a full operating system to enable the computing device 810 to interact with users, other programs, and other devices. The memory 830 may include one or more application programs 834. For example, the applications programs 834 may be executable to send or receive the data 112 of FIG. 1.

The processor 820 may communicate with one or more storage devices 840. For example, the one or more storage devices 840 may include nonvolatile storage devices, such as magnetic disks, optical disks, or flash memory devices. The storage devices 840 may include both removable and non-removable memory devices. The storage devices 840 may be configured to store an operating system, images of operating systems, applications, and program data. In a particular embodiment, the memory 830, the storage devices 840, or both, include tangible, non-transitory computer-readable media.

The processor 820 may also communicate with one or more input/output interfaces 850 that enable the computing device 810 to communicate with one or more input/output devices 870 to facilitate user interaction. The input/output interfaces 850 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 870 may include keyboards, pointing devices, displays, speakers, microphones, touch screens, and other devices.

The processor 820 may communicate with other computer systems 880 (e.g., the computing device 104-108 or the routing devices 110 of FIG. 1) via the one or more communications interfaces 860. The one or more communications interfaces 860 may include wired interfaces (e.g., Ethernet), wireless interfaces (e.g., an interface that operates according to a standard of the IEEE 802 family of standards), other wireless communication interfaces, or other network interfaces. The other computer systems 880 may include host computers, servers, workstations, and other computing devices.

Although only one computing device 810 is illustrated in FIG. 8, in particular embodiments, the network security system 120, the network monitor 122, the response system 150, or portions thereof, may be distributed among multiple computing devices, e.g., as a distributed computing system.

Examples described above illustrate but do not limit the disclosure. It should also be understood that numerous modifications and variations are possible in accordance with the principles of the present disclosure. Accordingly, the scope of the disclosure is defined by the following claims and their equivalents.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

What is claimed is:

1. A method comprising:
monitoring content of data packets communicated via a network and patterns of communication over the network; and
responsive to detecting a potential threat indicated by an anomalous activity in the content of the data packets or the patterns of communication:
selecting, by a processor of a network security system, a threat mitigation scheme from a plurality of threat mitigation schemes, the threat mitigation scheme corresponding to a set of response actions;
adjusting, by the processor, the set of response actions by:
comparing the anomalous activity to a policy, wherein the policy specifies an attribute of the anomalous activity and a particular response action, wherein the particular response action is prohibited responsive to the anomalous activity having the attribute; and
responsive to the anomalous activity having the attribute, removing the particular response action from the set of response action to generate a set of allowed response actions; and
executing, by the processor, one or more response actions of the set of allowed response actions, wherein the one or more response actions includes reconfiguring a routing device to block network access of a particular computing device, terminating a particular process executing on the particular computing device, reconfiguring security access associated with the particular computing device, or a combination thereof.

2. The method of claim 1, further comprising, responsive to detecting a second potential threat indicated by a second anomalous activity in the content of the data packets or the patterns of communication:
selecting, by the processor, a second threat mitigation scheme from the plurality of threat mitigation schemes, the second threat mitigation scheme corresponding to a second set of response actions;
in response to detecting the second anomalous activity, adjusting, by the processor, the second set of response actions by:
comparing the second anomalous activity to a second policy, wherein the second policy specifies a second attribute of the second anomalous activity and a second particular response action, wherein the second particular response action is prohibited responsive to the second anomalous activity having the second attribute; and
responsive to the second anomalous activity having the second attribute, removing the second particular response action from the second set of response action to generate a second set of allowed response actions, wherein the second set of allowed response actions is distinct from the set of allowed response actions; and
executing, by the processor, one or more response actions of the second set of allowed response actions.

3. The method of claim 1, wherein monitoring the content of the data packets includes:
analyzing, by the network security system, the content of the data packets communicated via the network and the patterns of communication over the network;
analyzing, by the network security system, the anomalous activity to determine whether the anomalous activity is indicative of the potential threat; and
generating, by the network security system, threat information indicating detection of the potential threat when the anomalous activity is indicative of the potential threat, wherein the threat mitigation scheme is selected based on the threat information.

4. The method of claim 3, further comprising before selecting the threat mitigation scheme, determining a source of the anomalous activity, wherein the threat mitigation scheme is selected further based on the source.

5. The method of claim 4, wherein the attribute corresponds to a particular source, and wherein the particular response action is prohibited responsive to the source corresponding to the particular source.

6. The method of claim 3, wherein the threat information includes a portion of the content of the data packets communicated via the network and the patterns of communication over the network corresponding to the anomalous activity, information descriptive of the anomalous activity, information descriptive of the anomalous activity, information descriptive of a source of the anomalous activity, information descriptive of a target of the anomalous activity, or a combination thereof.

7. The method of claim 1, further comprising configuring the network security system based on the one or more executed response actions of the set of allowed response actions of the policy, wherein the set of response actions includes at least one active threat response action or at least one passive threat response action, wherein the set of response actions comprises reconfiguring computing devices and reconfiguring security access associated with the computing devices.

8. The method of claim 1, further comprising, during or after execution of the one or more response actions:
   determine whether the potential threat is still present; and
   responsive to determining that the potential threat is still present:
      evaluating, by the network security system, the set of allowed response actions based on action dependencies and prior actions to determine an action plan, wherein the action plan identifies a set of next response actions, wherein the set of next response actions corresponds to one or more response actions of the set of allowed response actions for which every prerequisite action has been performed; and
      executing the set of next response actions.

9. The method of claim 1, wherein selecting the threat mitigation scheme includes:
   accessing threat-response data indicating identified threats and threat mitigation schemes indicated for use for each identified threat, wherein the threat-response data corresponds to the plurality of threat mitigation schemes; and
   determining whether the anomalous activity matches an identified threat of the threat-response data, wherein a particular threat mitigation scheme that is indicated for use for the identified threat is selected as the threat mitigation scheme when the anomalous activity matches the identified threat.

10. The method of claim 9, wherein selecting the threat mitigation scheme further includes when no identified threat matches the anomalous activity, searching a plurality of remote sources for second threat-response data that includes a particular identified threat that matches the anomalous activity.

11. The method of claim 1, wherein the plurality of threat mitigation schemes includes a first mitigation scheme from a first source and a second mitigation scheme from a second source distinct from the first source.

12. A computing system comprising:
   a processor; and
   a memory accessible to the processor, the memory storing instructions that are executable by the processor to perform operations comprising:
      monitoring content of data packets communicated via a network and patterns of communication over the network; and
      responsive to detecting a potential threat indicated by anomalous activity in the content of the data packets or the patterns of communication:
         selecting a threat mitigation scheme from a plurality of threat mitigation schemes, the threat mitigation scheme corresponding to a set of response actions;
         adjusting the set of response actions by:
            comparing the anomalous activity to a policy, wherein the policy specifies an attribute of the anomalous activity and a particular response action, wherein the particular response action is prohibited responsive to the anomalous activity having the attribute; and
            responsive to the anomalous activity having the attribute, removing the particular response action from the set of response action to generate a set of allowed response actions; and
         executing one or more response actions of the set of allowed response actions, wherein the one or more response actions includes reconfiguring a routing device to block network access of a particular computing device, terminating a particular process executing on the particular computing device, reconfiguring security access associated with the particular computing device, or a combination thereof.

13. The computing system of claim 12, wherein the policy specifies a second attribute of the anomalous activity and a second particular response action, and wherein adjusting the set of response actions includes, responsive to the anomalous activity having the second attribute, adding the second particular response action to the set of response actions.

14. The computing system of claim 12, wherein the operations further comprise:
   generating activity data based on the content of the data packets;
   analyzing the activity data to determine whether the activity data is indicative of the potential threat; and
   generating threat information indicating detection of the potential threat when the activity data is indicative of the potential threat, wherein the threat mitigation scheme is selected based on the threat information.

15. The computing system of claim 12, wherein the particular response action is a counterattack.

16. The computing system of claim 12, wherein the attribute is a source location of the anomalous activity.

17. A non-transitory computer-readable storage device storing instructions that are executable by a processor to cause the processor to perform operations comprising:
   monitoring content of data packets communicated via a network and patterns of communication over the network; and
   responsive to detecting a potential threat indicated by anomalous activity in the content of the data packets or the patterns of communication:
      selecting a threat mitigation scheme from a plurality of threat mitigation schemes, the threat mitigation scheme corresponding to a set of response actions;
      adjusting the set of response actions by:
         comparing the anomalous activity to a policy, wherein the policy specifies an attribute of the anomalous activity and a particular response action, wherein the particular response action is prohibited responsive to the anomalous activity having the attribute; and
         responsive to the anomalous activity having the attribute, removing the particular response action from the set of response action to generate a set of allowed response actions; and
      executing one or more response actions of the set of allowed response actions, wherein the one or more response actions includes reconfiguring a routing device to block network access of a particular computing device, terminating a particular process executing on the particular computing device, reconfiguring security access associated with the particular computing device, or a combination thereof.

18. The non-transitory computer-readable storage device of claim 17, wherein selecting the threat mitigation scheme includes:
   accessing threat-response data indicating identified threats and threat mitigation schemes indicated for use for each identified threat; and
   determining whether the potential threat matches an identified threat of the threat-response data, wherein:
      responsive to the potential threat matching the identified threat, a particular threat mitigation scheme corresponding to the identified threat in the threat-response data is selected; or
      responsive to no identified threat matching the potential threat, a user is prompted to specify the threat mitigation scheme.

19. The non-transitory computer-readable storage device of claim 17, wherein the attribute is that the anomalous activity originates within a particular firewall.

20. The non-transitory computer-readable storage device of claim 17, wherein the policy specifies a second attribute of the anomalous activity and a second particular response action, and wherein adjusting the set of response actions includes, responsive to the anomalous activity having the second attribute, adding the second particular response action to the set of response actions.

* * * * *